United States Patent [19]

Lauper

[11] 4,137,864
[45] Feb. 6, 1979

[54] ILLUMINATED POSITION INDICATOR FOR A CONTROL SHIFT LEVER

[75] Inventor: Warner R. Lauper, San Pedro, Calif.

[73] Assignee: Quadrastat Controls Corporation, Glendale, Calif.

[21] Appl. No.: 838,920

[22] Filed: Oct. 3, 1977

Related U.S. Application Data

[63] Continuation-in-part of Ser. No. 731,634, Oct. 12, 1976, abandoned.

[51] Int. Cl.² .............................................. G09F 9/00
[52] U.S. Cl. ............................. 116/28.1; 116/DIG. 20
[58] Field of Search ...... 116/124 M, 124 R, DIG. 20, 116/124.4

[56] References Cited

U.S. PATENT DOCUMENTS

| | | | |
|---|---|---|---|
| 2,671,425 | 3/1954 | Schneider | 116/124 R |
| 2,672,116 | 3/1954 | Gunderson | 116/124 M |
| 2,672,117 | 3/1954 | Morphew | 116/124 M |
| 2,738,756 | 3/1956 | Doane | 116/124 M |
| 2,925,061 | 2/1960 | Thornburgh et al. | 116/124 M |
| 3,231,857 | 1/1969 | Miller | 116/124 M |
| 3,242,900 | 3/1966 | Howard | 116/124 M |
| 3,896,759 | 7/1975 | Ogura | 116/124M |

Primary Examiner—Daniel M. Yasich
Attorney, Agent, or Firm—Whann & McManigal

[57] ABSTRACT

An illuminated position indicator for a control shift lever in which the shift lever housing has an associated dial with viewable character indicia thereon representing the respective driving range positions of the shift lever, the dial being associated with a light source providing a general illumination of all the dial indicia, and wherein a lens positioned between the dial and light source provides a concentrated beam for intensified illumination of the indicium corresponding to a selected position of the shift lever, a connection with the shift lever being such as to provide relative movements between the light beam and dial in response to shifting movements of the shift lever. In a modified arrangement, the dial indicium is visually intensified by colored backing member that is moved rectilinearly below the dial in response to selective movements of the shift lever.

17 Claims, 8 Drawing Figures

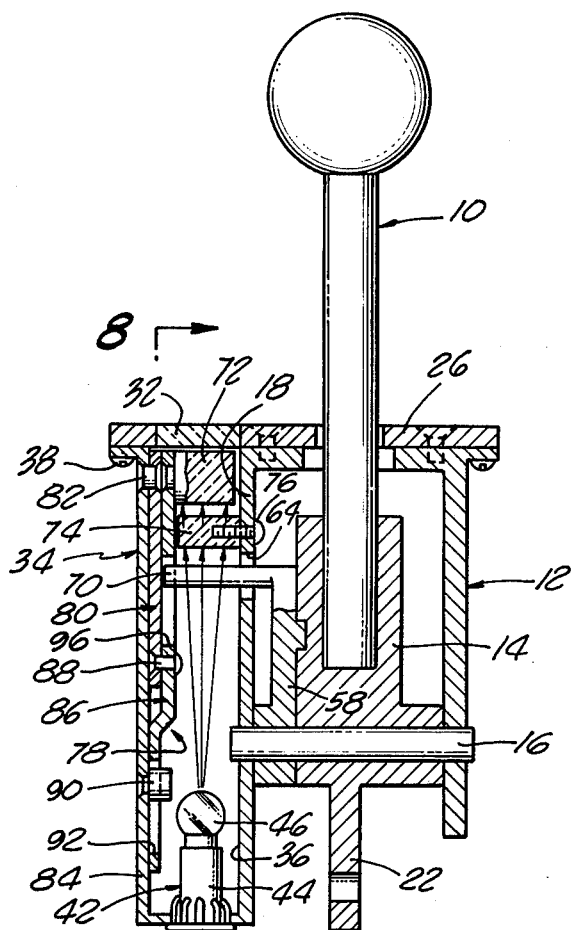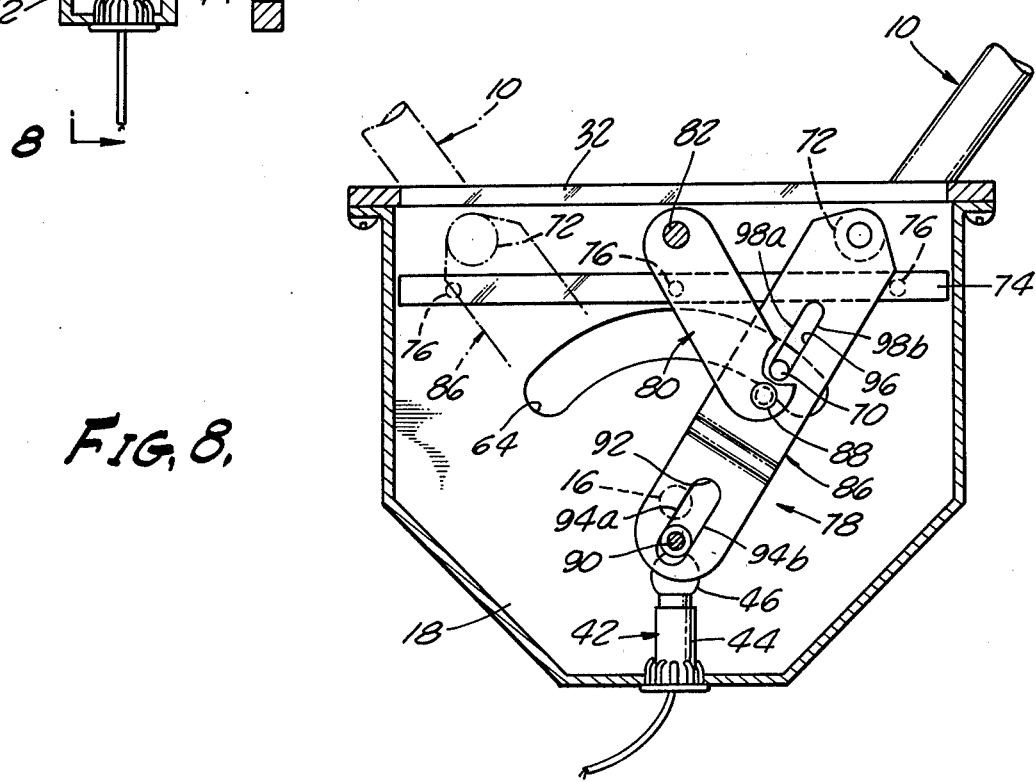

ILLUMINATED POSITION INDICATOR FOR A CONTROL SHIFT LEVER

This application is a continuation-in-part of my pending prior application, Ser. No. 731,634, filed Oct. 12, 1976 now abandoned.

PRIOR ART

In the prior art, there are a number of shift lever indicators utilizing light beams for illuminating a dial character or indicium which corresponds to the position of the shift lever. These arrangements differ widely and the closest art known to applicant are the following patents:

U.S. Pat. No. 2,671,425—Mar. 9, 1954
U.S. Pat. No. 2,738,756—Mar. 20, 1956
U.S. Pat. No. 2,860,596—Nov. 18, 1958
U.S. Pat. No. 3,896,759—July 29, 1975

BACKGROUND OF THE INVENTION

The present invention relates generally to the field of illuminated dial devices.

As evidenced by the above-noted prior art patents, a variety of arrangements have been disclosed for illuminated position indicators to identify the operating position of the shift lever, particularly at night time or during times of low visibility. While the known arrangements are generally effective for the purpose, it has been found that the presently known arrangements are not entirely satisfactory and include inherent undesirable disadvantages.

According to the present invention, it is proposed to utilize a fixed light source from a light bulb which is easily accessible for service, replacement, and the like, and which will avoid connection wire breakage which is characteristic of arrangements having movably mounted light sources. An important feature of the present invention is that the light source is arranged to provide general illumination of a light transmitting dial containing symbols or characters representing the various operating positions of the shift lever. The selected shift lever position is prominently identified and distinguished from the general illumination of the characters or symbols by utilizing a unique lens arrangement for producing an intensified light beam for illuminating the position characters or symbols respectively as the shift lever is moved from one position to the other. Additional prominence may be provided for the respective position indicating characters or symbols by utilizing a tinted lens that will project a concentrated light beam spot of a different color through the selected position symbol, thereby making it more distinguishable and recognizable with respect to the other symbols.

SUMMARY OF THE INVENTION

The present invention relates more specifically to the provision of unique illuminating means for shift lever position indicating dial devices, and particularly with respect to unique means for optically controlling the rays from a light source so as to provide a general illumination of the dial symbols or characters, while simultaneously providing a relatively movable intensified beam for illuminating the particular symbol or character for the selected shift lever position.

It is one object of the herein described invention to provide an improved illuminated position indicator dial source to reduce bulb breakage and broken wire connections, and wherein the light bulb is readily accessible for servicing.

A further object is to provide an illuminated position indicator according to the foregoing object, which is so arranged as to produce a general illumination of the dial together with an intensified relatively movable beam for indicating the selected active position of the shift lever.

Another object is to provide an illuminated indexing dial arrangement having a translucent dial with position indicating indicia thereon which may be selectively illuminated by an intensified beam from a control lens, such lens having a configuration to produce any one of a plurality of different effects, such as a colored intensified spot, round or rectilinear spot, converging light beam or diverging beam.

Still another object is to provide an illuminated dial arrangement, in which a light concentrating lens may be mounted in the housing of the shift lever or in a separate compartment having a divider wall with a slot for movement of a lens supporting bracket connected with the shift lever.

It is also an object to provide unique means for selectively intensifying the display of shift lever position indicating indicium during daytime use and at night time in association with a light source arranged to provide general illumination of the dial indicia.

Further objects of the invention will be brought out in the following part of the specification, wherein detailed description is for the purpose of fully disclosing the invention without placing limitations thereon.

BRIEF DESCRIPTION OF THE DRAWINGS

Referring to the accompanying drawings, which are for illustrative purposes only:

FIG. 7 is a sectional view similar to FIG. 2, showing a modified form of the invention; and FIG. 8 is a sectional view taken substantially on line 8—8 of FIG. 7, with the linkage assembly being shifted away from its mid-position.

DESCRIPTION OF THE SEVERAL EMBODIMENTS OF THE INVENTION

Figure 1:
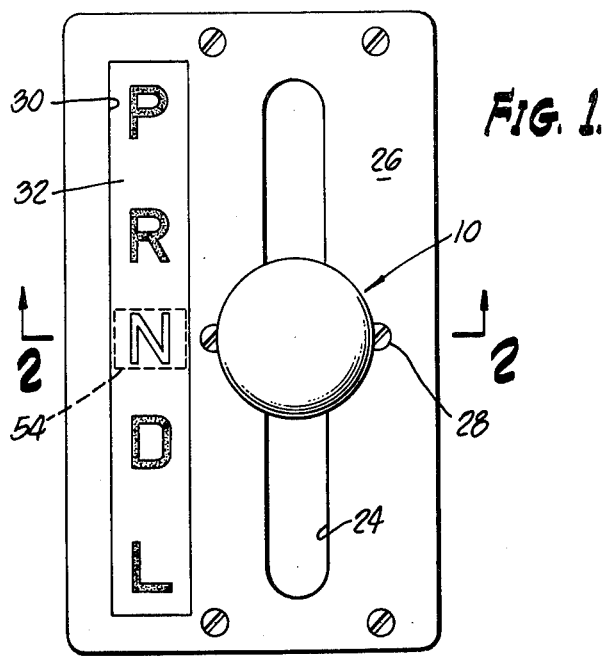
FIG. 1 is a plan view of a shift lever assembly having an illuminated dial indicator embodying the features of the present invention.

Referring more specifically to the drawings, for illustrative purposes, the illuminated position indicator of the present invention is shown as being associated with a shift lever 10 which is mounted on a U-shaped mounting bracket 12 and has its innermost end socketed into a pivotally mounted hub member 14 which is pivotally mounted for swinging movement on a pivot pin 16, the ends of this pin being supported in spaced walls 18 and 20 of the bracket. The hub member 14 carries an integrally formed projecting lever arm 22 which is suitably adapted for connection with an appropriate linkage connection with a transmission (not shown) or other mechanism containing instrumentalities which are to be shifted in response to shifting movements of the lever 10.

The lever 10 extends outwardly through elongate slot means 24 in which it is movable during shifting movements of the shift lever, this slot being formed in the bracket 12 and a top plate 26 which is affixed to the mounting bracket 12 by suitable means such as screws 28. As thus shown in FIGS. 1 and 2, the top plate 26 extends outwardly beyond the wall 18 to provide an overhanging portion which is formed with an elongated window opening 30 which extends in generally parallel relationship to the slot 24, this window being provided with an insert strip 32 of a suitable plastic or other light transmitting material, and upon which appropriate indicia in the form of symbols or characters are placed to provide an indicating dial showing the respective operating positions of the shift lever 10. The indicia herein are shown as comprising the letters "P" "R", "N", "D" and "L". These letters refer, respectively, to the "Park", "Reverse", "Neutral", "Drive" and "Low Gear" positions or settings of a shift lever 10.

Figure 2:
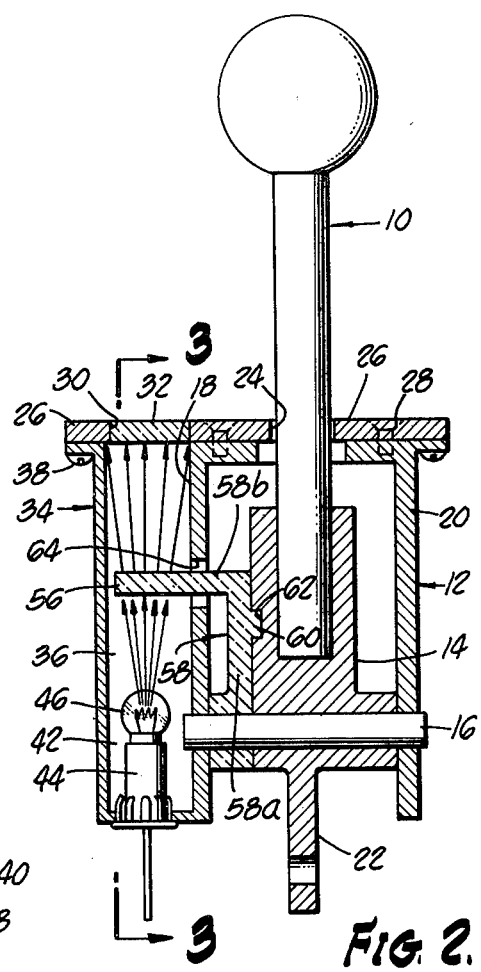
FIG. 2 is a transverse sectional view showing the operative relationship of the lever and position indicating components, taken substantially on line 2—2 of FIG. 1.
Figure 3:
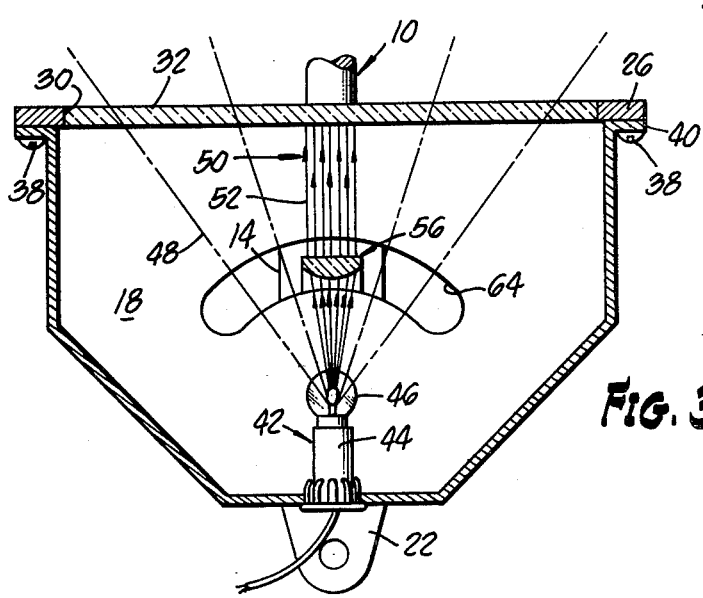
FIG. 3 is a sectional view taken through the compartment containing the indicator components, the section being taken substantially on line 3—3 of FIG. 2.

As best shown in FIGS. 2 and 3, the means for illuminating the indicating dial is shown as being contained within a separate housing or compartment with respect to the hub member 14 of the shift lever 10. However, it will be appreciated that such illuminating means, if desired, may be housed within the same housing or closure as that which contains the hub member 14.

More specifically, in the disclosed embodiment, a cover 34 is removably mounted by appropriate means in a position contiguous the wall 18 to form in cooperation with the wall 18 a separate compartment 36. One manner of attaching the cover 34 may include attaching screws 38 which extend through flange portions 40 of the cover.

A light source 42 for illuminating the dial insert strip 32 is provided in the compartment 36 and includes a snap-in type receptacle and a light bulb 46 therein. As thus arranged, the energized light bulb will emanate diverging light rays as indicated by phantom lines 48 and which will provide general illumination of the indicia on the insert strip 32.

In order to selectively indicate the operative position of the shift lever, optical means are provided for collecting radiated rays from the light source in a manner to form a concentrated beam 50 containing light rays as indicated at 52, which will provide an intensified spot illumination 54 of the character or symbol corresponding to the operative position of the shift lever 10.

For such purpose, lens means 56 are positioned between the light source 42 and the insert strip 32 of the indicating dial. As thus arranged, it will be appreciated that upon relative movement of the lens means and the dial, the beam 50 may be selectively shifted from one indicating indicium to the other in correspondence to the shifted positions of the shift lever 10.

It is preferred to obtain relative movement between the lens means and the dial by connecting the lens means with a right-angled support bracket 58 which has a leg 58a pivoted on the pivot pin 16 and interlocked to the hub member 14 for swinging movement therewith by means of a projecting boss 60 of this bracket leg which is adapted to extend into a recess 62 of the hub structure. Another leg 58b of the right-angled bracket is arranged to extend through and to be movable within an arcuate slot 64 formed in the wall 18, this slot having a center of curvature positioned at the pivotal axis of pivot pin 16.

The lens means may be formed as a separate element and suitably mounted on the leg 58b of the bracket 58, but is preferably integrally formed with the bracket 58 from a suitable plastic material which will enable the lens portion thereof to be molded into desired lens configurations for producing different beam effects.

Figure 4:
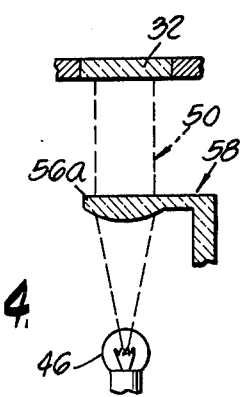
FIG. 4 is a fragmentary view diagrammatically illustrating the use of a plano-convex lens arrangement to obtain a beam of circular transverse configuration as shown in FIG. 5.
Figure 5:
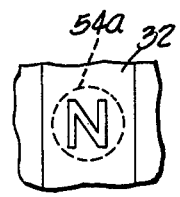
Figure 6:
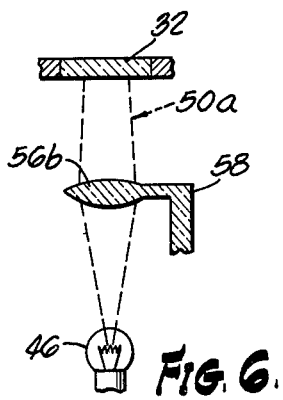
FIG. 6 is a diagrammatic view illustrating the use of a convex-convex lens configuration to obtain a converging beam of circular transverse configuration.

As exemplary of some of the different beam effects which may be possible, the lens means may be tinted so as to provide an intensified colored beam for illuminating the selected position of the shift lever in a different color than that provided by the general illumination of the other position indicating indicium which are simultaneously subjected to the general illumination from the light source. By utilizing an elongate plano-convex lens configuration as shown in FIGS. 2 and 3, it is possible to obtain a rectangular beam illumination as indicated at 54 of FIG. 1. If a circular spot illumination is desire, as shown in FIG. 5 and indicated by the numeral 54a, a circular plano-convex lens configuration 56a as shown in FIG. 4 will be utilized. Also, if desired to obtain a converging beam, as indicated at 50a in FIG. 6, the lens means will be formed to provide a circular convex-convex lens configuration as indicated at 56b of FIG. 6.

From the foregoing, it will be appreciated that a great latitude of lens configurations may be utilized in connection with the present invention to meet different design concepts and different installation conditions.

Referring more specifically to FIGS. 7 and 8 of the drawings, there is shown a modified structure in which the beam producing lens means 56 has been eliminated, and instead of the bracket leg 58b a drive pin 70 is carried by the bracket 58, this drive pin extending through the arcuate slot 64 formed in the wall 18.

Instead of utilizing a light beam to provide an intensified spot illumination of the character or symbol corresponding to the operative position of the shift lever 10, an element 72 of translucent material is arranged for movement along the underside of the dial insert strip 32. This element is preferably of a contrasting color to the indicia of the dial strip, and of a sufficient size to respectively outline each indicia and thereby produce a distinguishing color differential of the particular indicium corresponding to an adjusted position of the shift lever.

Normally, the indicia would be of clear light transmitting plastic. In order to make the indicia more legible during daylight use, a background member 74, of translucent material, is shown as being positioned below the dial strip 32. As thus arranged, the element 72 will be moved in the intervening space between the dial strip and the background member 74. The background member may vary as to construction, but is shown as comprising an elongate strip member of translucent material that is secured in operative relation to the wall 18 by means of retaining screws 76. The background member thus extends horizontally below the dial strip 32, and in generally parallel relation thereto.

Since the dial strip 32 has a longitudinally straight configuration, it will be appreciated that it is desirable that the element 72 should have a substantially straight line path of movement below the dial strip 32. The required straight line movement of the element 72 is accomplished by a unique linkage assembly, as generally indicated by the numeral 78, and which has a driving connection through the drive pin 70 with the shift lever 10 such that movement of the shift lever to its respective operating positions will result in the movement of the element 72 to the appropriate corresponding indicating indicium, and that in each such position, the element 72 will change the viewed appearance of the indicia in a manner to enhance its prominence with respect to the other indicia.

More specifically, the linkage assembly 78 is disclosed as comprising a first link member 80 having one end supported on a fixed pivot 82 secured to an outer wall 84 of the cover 34. The pivot 82 is positioned intermediate the ends of the dial strip 32 and closely adjacent therebelow.

An elongated second link member 86 is pivotally connected intermediate its ends to the other end of the first link 80 by means of a pivot 88. One end of the second link member 86 mounts the element 72, and the opposite end of the link member 86 is slidably connected with a fixed pivot 90 secured to the wall 84 at a point substantially perpendicularly below the fixed pivot 82. The pivot 90 has its outermost end positioned for guided movement in a longitudinally extending slot 92 formed by spaced apart edges 94a and 94b.

The outermost end of the drive pin 70 is positioned for longitudinal movement within a longitudinally extending slot 96 formed between spaced apart edges 98a and 98b. It will be appreciated that, instead of using slots as described above, appropriate surface grooves may be formed on the link member 86 to respectively receive the drive pin 70 and pivot 90.

With the above described linkage, swinging movement of the link 86 by the driving pin 70 will move the element 72 in a substantially straight line path between the ends of the dial plate 32; and in the respective positions of the shift lever 10, the element 72 will mask the appropriate indicium for each particular shift lever position. Thus, a distinctive appearance will be provided for each position indicating indicium during daylight operation.

When the light source, light bulb 46, is activated, as for example during night driving, or times of low visibility, the emitted rays will produce a general illumination of the indicia on the dial strip 32 after passing through the background member 74. A portion of the emitted rays will also pass through the element 72, and thus provide a differentiating and distinguishing visual indication with respect to each appropriate indicium, as the shift lever is moved from one operating position to the other.

From the foregoing description and drawings, it will be clearly evident that the delineated objects and features of the invention will be accomplished.

Various modifications may suggest themselves to those skilled in the art without departing from the spirit of my invention, and, hence, I do not wish to be restricted to the specific form or forms shown or uses mentioned, except to the extent indicated in the appended claims.

I claim:

1. An illuminated indicator for selectively indicating the respective operative positions of a movably mounted shift lever, comprising:

(a) a bracket mounting said shift lever for selective swinging movements about an axis of rotation to its respective operative positions;

(b) wall means at one side of said bracket providing a substantially closed compartment adjacent one end of said axis of rotation, said compartment having one wall formed with an elongated window opening facing generally towards the outer end of said shift lever and having its longitudinal axis in substantially parallel relation to the plane of swinging movement of the shift lever, and another wall between said compartment and said bracket having an arcuate opening therein;

(c) an elongated dial of light transmitting material positioned in said window opening, said dial having longitudinally spaced indicia thereon corresponding to the respective positions of the shift lever;

(d) a light source within said compartment fixedly mounted on a wall opposite said dial providing a general illumination of said dial and the indicia thereon;

(e) optical means within said compartment positioned between said light source and said dial for concentrating a portion of the rays from said source into a beam of a size to provide a distinguishing spot illumination of a single indicium; and (f) a support for said optical means extending through said arcuate opening and being connected to said lever so as to shift said optical means and said distinguishing spot illumination from one indicium to another in accordance with the respective positions of said shift lever.

2. An indicator according to claim 1, in which said optical means for concentrating rays from said source into a beam includes a lens structure, and said support comprises a second bracket having one end connected with the lens structure and its other end connected with said shift lever.

3. An indicator according to claim 2, in which the dial is of a rectilinear flat configuration and the lens structure is moved in a curved path below the dial having a center of curvature coincident with the pivotal axis of the shift lever.

4. An indicator according to claim 2, in which said second bracket and lens are integrally formed of a plastic material.

5. An indicator according to claim 2, in which said light source includes an externally removable lamp and receptacle releasably connected with the compartment wall at a position below the lens.

6. An indicator according to claim 2, in which the lens is tinted so that the indicium illuminated by said beam will be of a distinctive color.

7. An indicator according to claim 2, in which said lens is conformed to project a beam of substantially circular transverse section onto said dial.

8. An indicator according to claim 2, in which said lens is conformed to project a beam of substantially rectangular transverse section onto said dial.

9. An indicator according to claim 2, in which the lens is conformed to project a converging beam onto said dial.

10. An indicator according to claim 2, in which the lens is conformed to project a diverging beam onto said dial.

11. An indicator according to claim 2, in which the lens is plano-convex.

12. An indicator according to claim 2, in which the lens is convex-convex.

13. An indicator for selectively and distinctively indicating the respective operative positions of a movably mounted control shift lever, comprising the combination of:

(a) a housing structure having a top closure;
(b) a control shift lever having an inner end pivoted within said housing, said lever having a portion extending to the exterior of the housing through an elongated slot in said top closure and being selectively movable in said slot to said respective operative positions;
(c) an elongated dial of longitudinally straight configuration mounted in said top closure in adjacent substantially parallel relation to said slot, said dial having longitudinally spaced light transmitting indicia thereon corresponding to the respective positions of said shift lever, and being visible from the housing exterior;
(d) means in said housing for selectively changing the viewable appearance of said indicia in accordance with the movement of said shift lever from one operative position to another, said means including an element supported for movement along the underside of said dial, said element having a color differing from that of the indicia and being of a size to outline a single indicium; and
(e) linkage means connecting said element with said lever operable to move said element in a substantially rectilinear path, said linkage means comprising:
a first link member having one end supported on a fixed pivot positioned intermediate the dial ends and closely adjacent therebelow;
an elongated second link member pivotally connected intermediate its ends to the other end of said first link and having one end mounting said element positioned adjacently below said dial;
a sliding connection between the other end of said second link and said housing; and
a driving connection with said shift lever operative to swing said first link on its fixed pivot in response to movements of the shift lever.

14. An indicator according to claim 13, in which said sliding connection comprises a fixed pivot on said housing positioned perpendicularly below the fixed pivot of said first link; and a longitudinally extending slot on said second link for slidingly receiving said fixed pivot.

15. An indicator according to claim 13, in which said driving connection comprises a pin carried by said shift lever movable in an arcuate path; and a longitudinally extending slot on said second link for slidingly receiving said pin.

16. An indicator according to claim 13, in which an underlying elongate translucent background forming member is supported in spaced relation below said dial, and said element is movable in a path between said dial and said background member.

17. An indicator according to claim 16, which includes a light source in said housing positioned below said element and the background member, whereby rays emanating from said source will pass through said background member to provide general illumination of the dial indicia, and through said element to distinctively distinguish the indicium corresponding to the position of the shift lever.

* * * * *